US007324831B2

(12) United States Patent
Haartsen

(10) Patent No.: US 7,324,831 B2
(45) Date of Patent: Jan. 29, 2008

(54) METHOD AND SYSTEM FOR ASYMMETRIC DUAL-MODE RADIO COMMUNICATIONS

(75) Inventor: Jacobus Haartsen, Hardenberg (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 10/595,344

(22) PCT Filed: Oct. 8, 2004

(86) PCT No.: PCT/SE2004/001440

§ 371 (c)(1),
(2), (4) Date: Apr. 11, 2006

(87) PCT Pub. No.: WO2005/039116

PCT Pub. Date: Apr. 28, 2005

(65) Prior Publication Data

US 2007/0004447 A1    Jan. 4, 2007

Related U.S. Application Data

(60) Provisional application No. 60/511,635, filed on Oct. 17, 2003.

(51) Int. Cl.
*H04B 1/38* (2006.01)
*H04M 1/00* (2006.01)
(52) U.S. Cl. ............... 455/552.1; 455/83; 455/88; 455/103; 370/401; 370/409
(58) Field of Classification Search ............ 455/133, 455/272, 277.1, 277.2, 103, 132, 83, 88, 455/552.1; 370/401, 409
See application file for complete search history.

(56) References Cited

U.S. PATENT DOCUMENTS

| 5,754,961 | A  | * | 5/1998 | Serizawa et al. ........... 455/517 |
| 6,400,990 | B1 |   | 6/2002 | Silvian |
| 6,519,460 | B1 |   | 2/2003 | Haartsen |
| 6,987,956 | B2 | * | 1/2006 | Yoon ........................ 455/133 |
| 7,047,042 | B2 | * | 5/2006 | Komara et al. ............. 455/561 |
| 2002/0012381 | A1 |   | 1/2002 | Mattisson et al. |
| 2002/0131426 | A1 | * | 9/2002 | Amit et al. ................ 370/401 |
| 2005/0058153 | A1 | * | 3/2005 | Santhoff et al. ........... 370/466 |
| 2006/0035669 | A1 | * | 2/2006 | Chuprun et al. ........... 455/557 |

FOREIGN PATENT DOCUMENTS

| WO | WO 0219544 A2  | 3/2002 |
| WO | WO 02091769 A1 | 11/2002 |
| WO | WO 03065288 A1 | 8/2003 |

OTHER PUBLICATIONS

Swedish Patent Office, International Search Report for PCT/SE2004/001440, dated Jan. 17, 2005.

* cited by examiner

*Primary Examiner*—Matthew Anderson
*Assistant Examiner*—Tuan Pham
(74) *Attorney, Agent, or Firm*—Roger S. Burleigh

(57) ABSTRACT

Transmitter and receiver functionality are separated in dual-mode radio transceivers to support high-rate services. Transceivers with highly asymmetric requirements that need only a high-rate transmission or only high-rate reception functionality are supported by including a high-rate transmitter to support pushing data out or a high-rate receiver to support pulling data into the transceiver at high data rates.

10 Claims, 5 Drawing Sheets

METHOD AND SYSTEM FOR ASYMMETRIC DUAL-MODE RADIO COMMUNICATIONS

CROSS-REFERENCE TO RELATED APPLICATION

This application claims the benefit of Provisional Patent Application Ser. No. 60/511,635 filed Oct. 17, 2003.

FIELD OF THE INVENTION

The invention relates to the area of data communications. In particular, the invention relates to radio communications with different channels in uplink and in downlink.

BACKGROUND

In the last few decades, progress in radio and Very Large Scale Integration (VLSI) technology has fostered widespread use of radio communications in consumer applications. Portable devices, such as mobile radios, can now be produced having acceptable cost, size and power consumption. Mobile phone communications for the consumer market started with phone systems derived from the police and rescue services and was based on an analog technology improved and optimized in the seventies and eighties. Examples of these analog phone systems are Nordic Mobile Telephone (NMT) and Total Access Communications System (TACS). The usage of mobile phones really took off in the nineties with the introduction of mobile phone systems based on digital technology like Global System for Mobile Communications (GSM), Digital Advanced Mobile Phone Service (D-AMPS) and Personal Digital Cellular (PDC). Generally, the analog systems are indicated as being the first generation, whereas the digital systems are indicated as second generation.

Currently, third generation systems are being developed. Two different development paths can be distinguished. One path considers completely new systems based on a technology that differs from the previous generation. For example, the third generation system, Universal Mobile Telecommunication System (UMTS) being developed in Europe, Asia and the US, though digital, is based on wideband transmission whereas most second generation systems are based on narrowband transmission. The other path considers high data rate (used interchangeably with high-rate(s) hereinafter) in the existing second-generation systems. An example is the EDGE mode applied in GSM and in D-AMPS. In the latter case, a second-generation system is updated to a third generation system through the use of high rate modes.

This general trend of updating an existing system by adding dedicated functionality like higher data rates is attractive since the system basic functions like control and mobility support can still be based on the conventional system operation whereas only dedicated modes make use of the advanced features. Compatibility with existing portable devices is guaranteed.

A limitation in the current solution is that, in order to establish a dedicated high-speed link, both sender and receiver must be capable of supporting the higher data rates. Although trivial at first sight, this is not at all the case when it is understood that for many of the applications where high data rates are desired, the increase in data rate is desired in one direction only. For example when a laptop downloads a file to a printer via a short range radio link like Bluetooth, the increased data rate is required only in the direction from the laptop to the printer. The return channel from the printer to the laptop is only required to support basic data link control (DLC) messages and other link related signaling. The return channel can easily be supported by the conventional radio link. It will be understood that an information sink like a printer preferably has an advanced receiver for high-rate reception. The transmitter, though, can be of a simple type as only low data rates (used interchangeably with low-rate(s) hereinafter) have to be supported in the transmit direction seen from the printer. Alternatively, examples can be found of typical information sources.

Consider a digital camera. The user wants to transfer the pictures out of the camera at high speed but will never transfer pictures into the camera. Therefore, the camera preferably has an advanced transmitter for supporting high data rates whereas the receiver can be fairly simple. Since the complexity of a high-rate radio transmitter is very different from the complexity of a high-rate radio receiver, it is recognized that the benefit of adding high-speed modes can be improved by taking into account the asymmetric speed requirements.

Therefore, there is a need in the art for a system where high-speed modes can be supported with reduced costs if asymmetry in the speed requirements is present.

SUMMARY OF THE INVENTION

Transmitter and receiver functionality are separated in dual-mode radio transceivers to support high-rate services. In order to support both the conventional (low-rate) and high-rate air interfaces, radio transceivers are usually designed to support both schemes. The present invention addresses systems with highly asymmetric requirements that need only a high-rate transmission or only high-rate reception functionality.

A conventional air interface is used for conventional support functions like connection setup, link supervision and so on. In addition, a high-rate transmitter is included to support pushing data out of the terminal at high data rates for terminals with typical source functionality like (digital) camera's or CD players. Alternatively, a high-rate receiver is included to support pulling data into the terminal at high data rates for terminals with typical sink functionality like a printer or a display. In both cases, the feedback or return channel supporting the communications over the high-rate link is transferred over the low-rate air interface. This allows sink terminals to avoid implementing (advanced) high-rate transmitters, whereas it allows source terminals to avoid implementing (advanced) high-rate receivers.

In order to support the message exchange at the higher levels, the Open Systems Interconnect (OSI) model is split at the physical layer. As a result, the data link control and media access layer are carried on the high-speed physical channel in one direction, whereas the conventional physical channel carries them in the reverse direction.

BRIEF DESCRIPTION OF THE FIGURES

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 8, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged system for asymmetric dual-mode radio communications.

Figure 1:
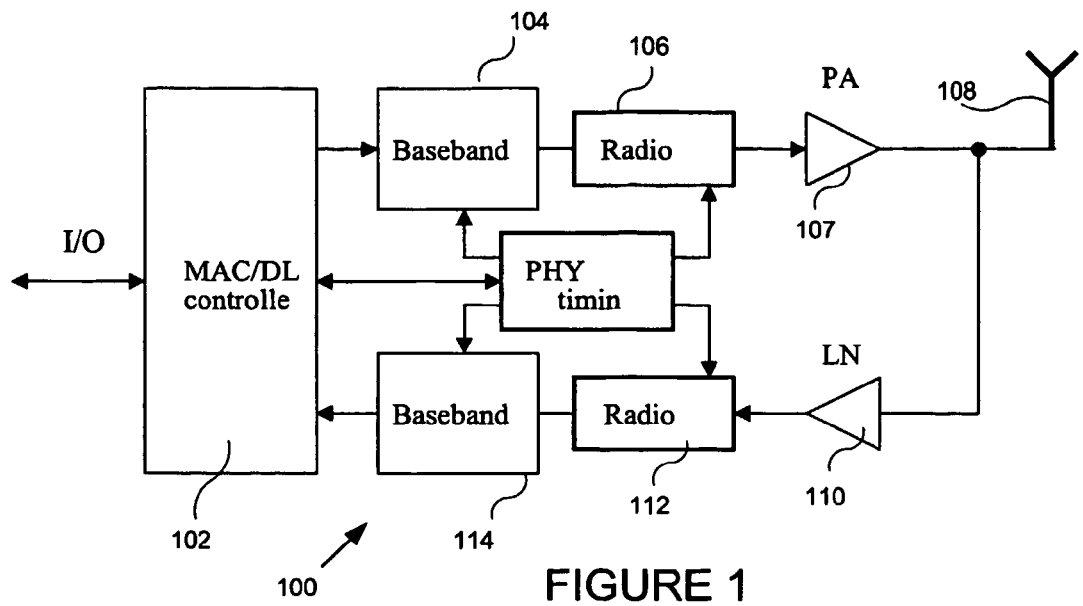
FIG. 1 depicts a conventional single-mode transceiver for symmetric usage.

Radio implementations have improved considerably compared with the equipment Marconi was using at the turn of the last century to send the first radio messages across the Atlantic. However, although size, power consumption, and price have reduced dramatically with the advent of silicon integrated circuitry, the basic radio transceiver architecture has not changed that much. FIG. 1 depicts a conventional single-mode transceiver 100 for symmetric usage. Information is provided by a host system (cellular phone, PDA or any other electronic equipment) over the I/O interface. In most modern systems, this information already has a digital format.

In MAC/DLC controller 102, this information is prepared for transfer over the wireless interface. For example additional control information is added in the form of error control bits. At the proper moment in time, which may depend on the type of medium access control (MAC) scheme, the data is ready to be transmitted over the radio channel. Baseband controller 104 packetizes the information and the digital bits are mapped onto symbols appropriate for RF transmission (again error control information may be added). This baseband signal is then provided to the radio TX part 106. There, the baseband signal is properly shaped and converted to a suitable RF frequency (e.g. in the range between 0.5-5 GHz), amplified by the power amplifier (PA) 107 and transmitted by antenna 108.

In the return path, the RF signal is picked up by antenna 108, amplified by the low-noise amplifier (LNA) 110 and down-converted and filtered in radio RX part 112. Baseband controller 114, timing and frequency synchronization are applied and the symbols are retrieved and are mapped to bits. Error correction may be applied, as well as equalization and other recovery techniques. The payload in the received packet is then provided to MAC/DLC controller 102, which applies further checks and operations according to the DLC protocol. Finally, the received information is provided to the I/O interface and offered to the host system.

Many systems today are applied with additional modes to improve specific features, for example the data rate. As an example, in cellular phones based on GSM, additional EDGE modes can be included for packet-switched communications and higher data rates. Another example is Bluetooth, where higher rata modes are being developed. Since the basic radio in GSM or Bluetooth transceivers can only support the basic air interface, additional circuitry has to be added to support the high-rate modes. For example, in GSM, the basic GSM air interface uses a GMSK constant-envelope, non-linear modulation, which allows class-C transmitters and limiting receivers. In contrast, EDGE uses a linear, 8-PSK modulation which requires more advanced radio transmitters and receivers. In a similar fashion, the basic Bluetooth air interface applies a 1-MHz wide, nonlinear constant-envelope, GFSK modulation allowing class-C transmitters and limiting receivers. The high-rate mode being developed uses a 4-MHz wide PSK modulation requiring more linear transmitters and receivers.

Figure 2:
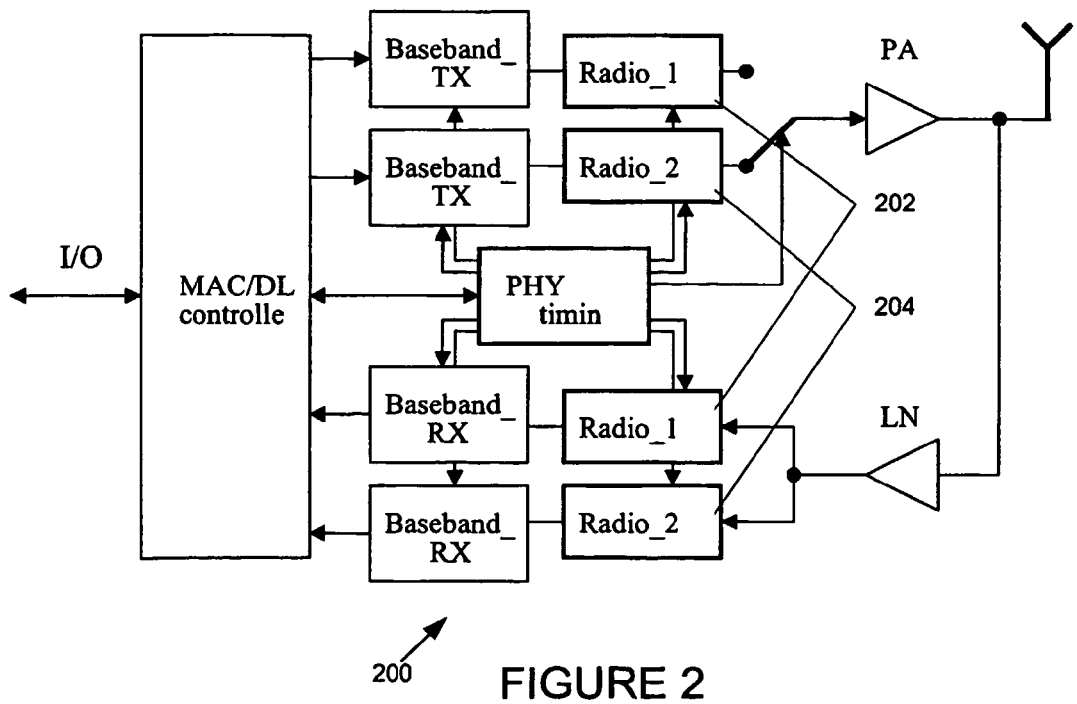
FIG. 2 illustrates a conventional dual-mode transceiver for symmetric usage.

FIG. 2 illustrates a conventional dual-mode transceiver for symmetric usage. Circuit 202 (baseband_1 Tx-radio_1 TX combination on the transmit side and baseband_1 RX-radio_1 RX combination on the receive side) supports the classic air interface. Circuit 204 (the baseband_2 TX/radio_2 TX on the transmit side and the baseband_2 RX-radio_2 RX on the receive side) supports the high rate. Depending on which mode is used, the PHY control chooses circuit 202 or 204.

In practice, many applications have an extremely asymmetric traffic behavior. Take as an example digital camera 302 in FIG. 3a. The input to camera 302 is the pictures taken by the user. The user may then wish to transfer the pictures taken to another medium like disk storage, PC 304, or a color printer. This can be achieved via a wireless link between camera 302 and this other medium. However, it will be understood that the data stream will always be from the camera to the external medium and never the other way around.

Figure 3A:
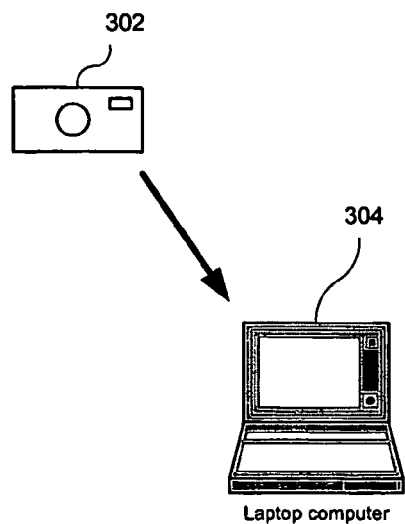
FIG. 3a depicts typical asymmetric applications with a camera as information source.
Figure 3B:
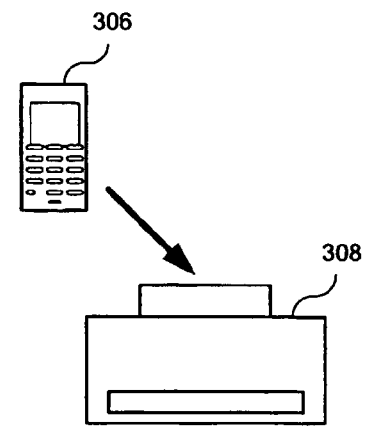
FIG. 3b depicts typical asymmetric applications with a printer as information sink.

Another example is shown in FIG. 3b. Shown here is printer 306. The user may transfer data wirelessly from their portable devices like laptop, PDA 308, cell phone, and digital camera to printer 306 to be printed. Never is traffic expected from the printer to the portable devices. So basically, the printer only needs a receiver. Yet another example of an information sink (not shown) is a browser with a display to surf the Internet over the cellular network. The dominant traffic is from the network to the browser and not vice versa.

These examples show that many applications only require a transmitter or a receiver for their traffic. However, two-way connections are always necessary for supporting functionality. At initial connection setup both ends of a connection need to be able to exchange information regarding the channel, authentication, encryption, and other supervising functions. Also, in data communications, automatic retransmission protocols are often used to resend messages that were corrupted at reception. All these supporting functions do not need extremely high data rates, but require a transmit/receive combination in any unit. However, once the connection is established, a high-rate link may be incorporated in one direction to speed up the data flow and return control information may be carried over the (low-rate) basic link.

Figure 4:
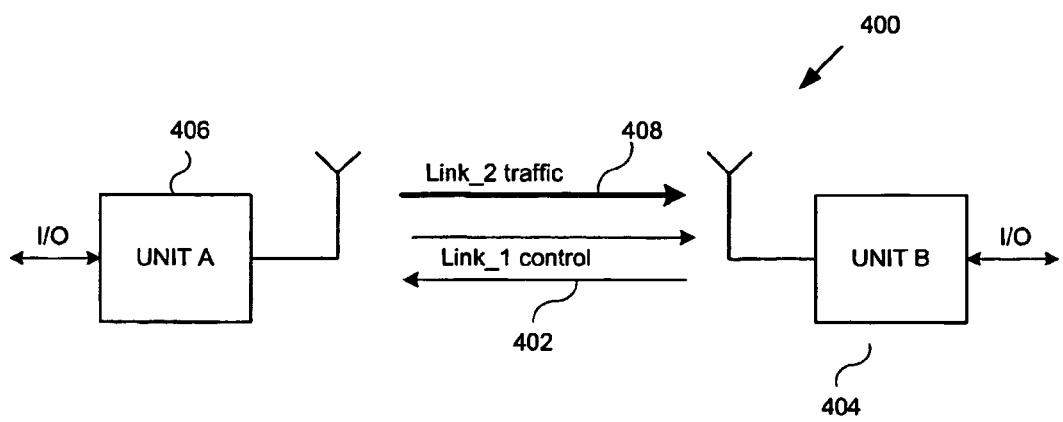
FIG. 4 illustrates a dual-mode, asymmetric connection.

FIG. 4 illustrates a dual-mode, asymmetric connection 400. Link 1_control 402 is a bi-directional link for the exchange of control information between units A 406 and B 404. Link 2 408 is a uni-directional link to transfer user information from unit A 406 to unit B 404. In this case, units A 406 and B 404 need both a transmitter and receiver for link 1 402. However, unit A 406 only needs a transmitter for link 2 408 whereas unit B only needs a receiver for link 2 408. An example of dual-mode transceiver architecture for unit A, according to an embodiment of the invention is shown in FIG. 5a.

Figure 5A:
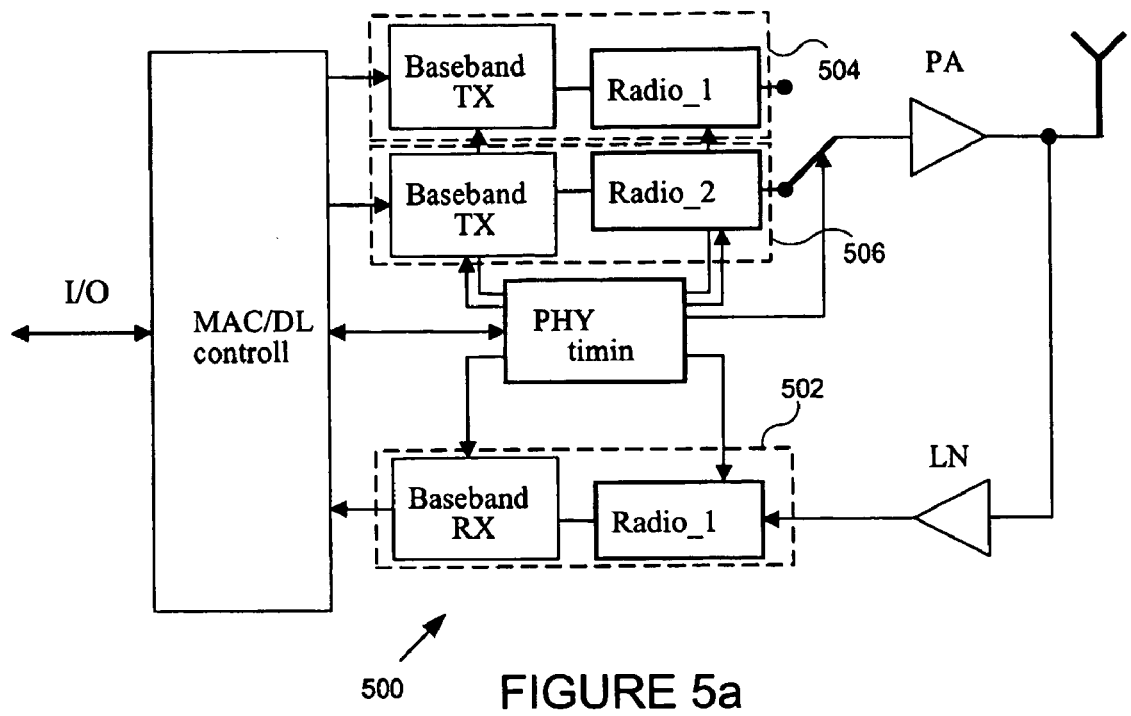
FIG. 5a depicts a dual-mode transceiver with advanced transmitter for asymmetric usage according to an advantageous embodiment of the present invention.

FIG. 5a depicts a dual-mode transceiver 500 with an advanced transmitter for asymmetric usage according to an advantageous embodiment of the present invention. The high-rate receiver 'chain', that is the advanced receive circuitry for processing of high-rate signals, is not present. For example, in the case of Bluetooth and its high rate mode, the receiver section only consists of basic Bluetooth receiver 502, which can be based on a limiting, non-coherent concept. To support the high-rate mode, only the transmission section needs to be modified to support the more advanced signaling scheme. As shown in transceiver 500, the basic transmitter 504 is enhanced with advanced transmitter 506.

Figure 5B:
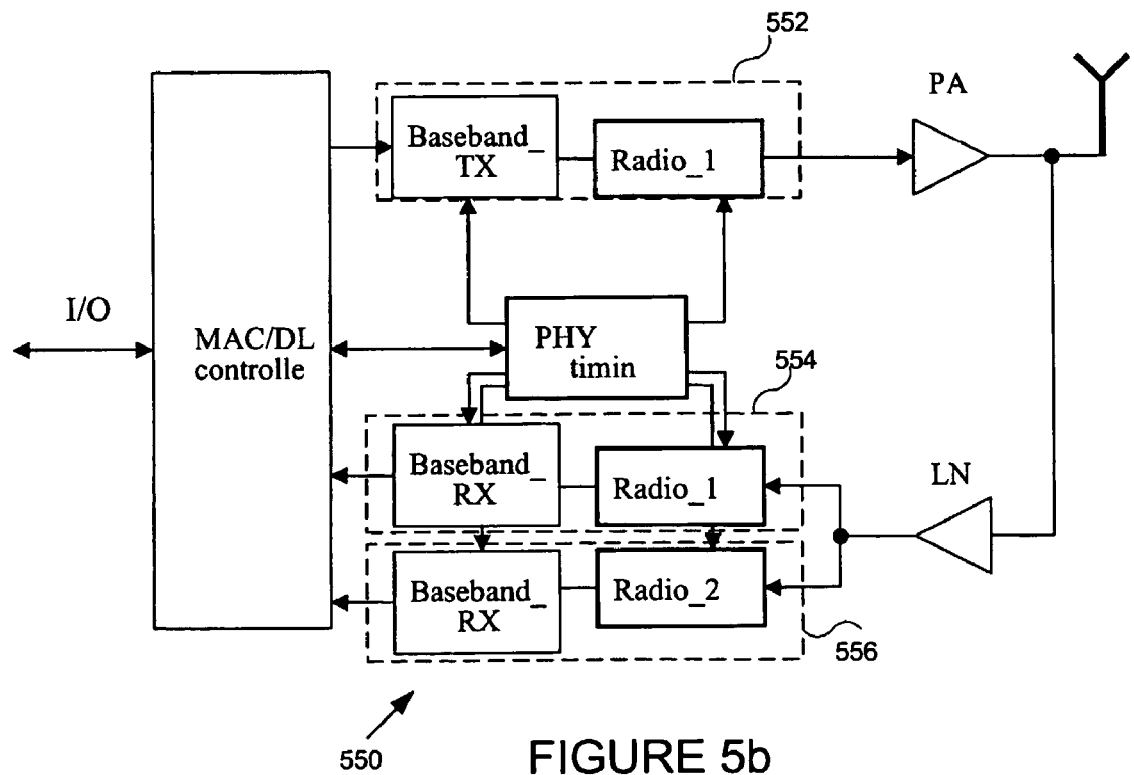
FIG. 5b illustrates a dual-mode transceiver with advanced receiver for asymmetric usage according to an advantageous embodiment of the present invention.

Alternatively, FIG. 5b illustrates dual-mode transceiver 550 with an advanced receiver for asymmetric usage according to an advantageous embodiment of the present invention. Here, only a basic transmitter 552 for link 1 is present. Both basic receiver 554 and advanced receiver 556 are implemented in this information sink unit. For Bluetooth high-rate, advanced receiver 556 may be linear, use equalization and other advanced signal processing techniques. In summary, both the implementations of dual-mode transceivers 500 and 550 are reduced in cost as the TX part or the RX part of the advanced air interface of the transceivers are implemented corresponding to the typical usage.

Figure 6:
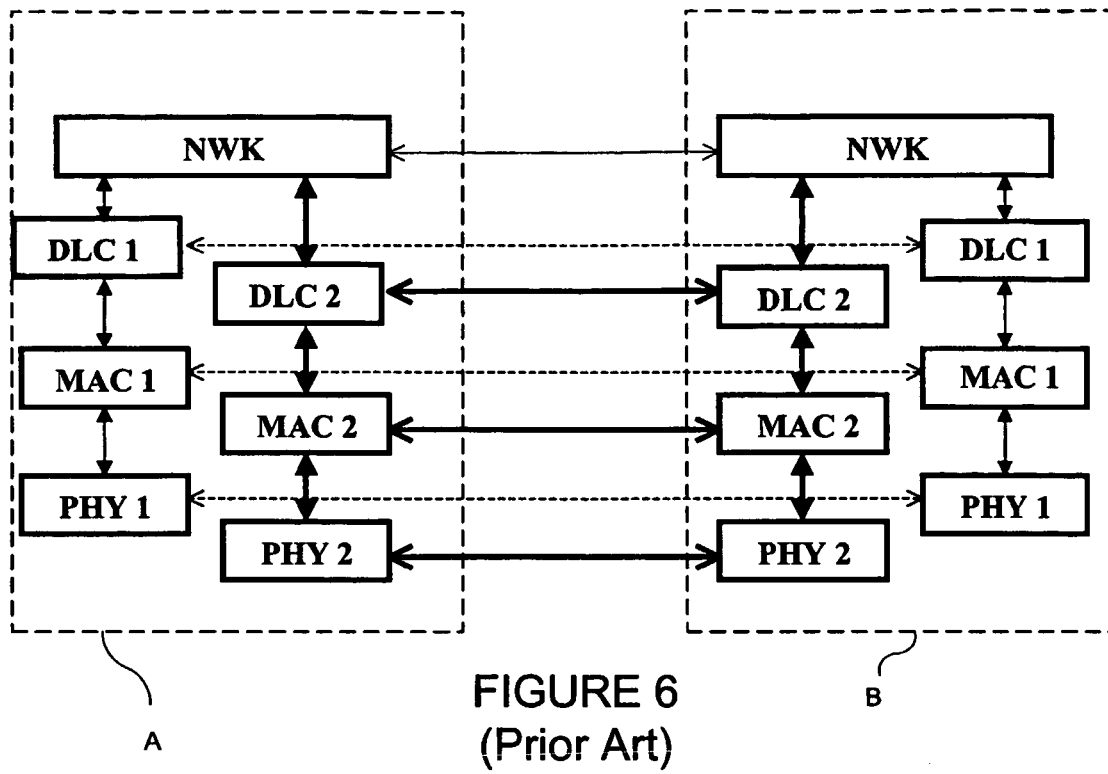
FIG. 6 depicts a conventional Open Systems Interconnect (OSI) model for low-rate and high-rate modes.

Communication protocols are usually constructed according to the OSI layered model. In the present invention, only the lower layers of the OSI model are considered (i.e., the application and presentation layers are ignored). FIG. 6 shows the protocol stack in units A and B assuming they have both implemented a conventional dual-mode radio with transceivers for bi-directional transfer on links 1 and 2. Each layer in one unit has its corresponding layer in the other unit. The dashed lines represent the different protocols supported on link 1 while the solid lines represent the different protocols supported on link 2.

Figure 7:
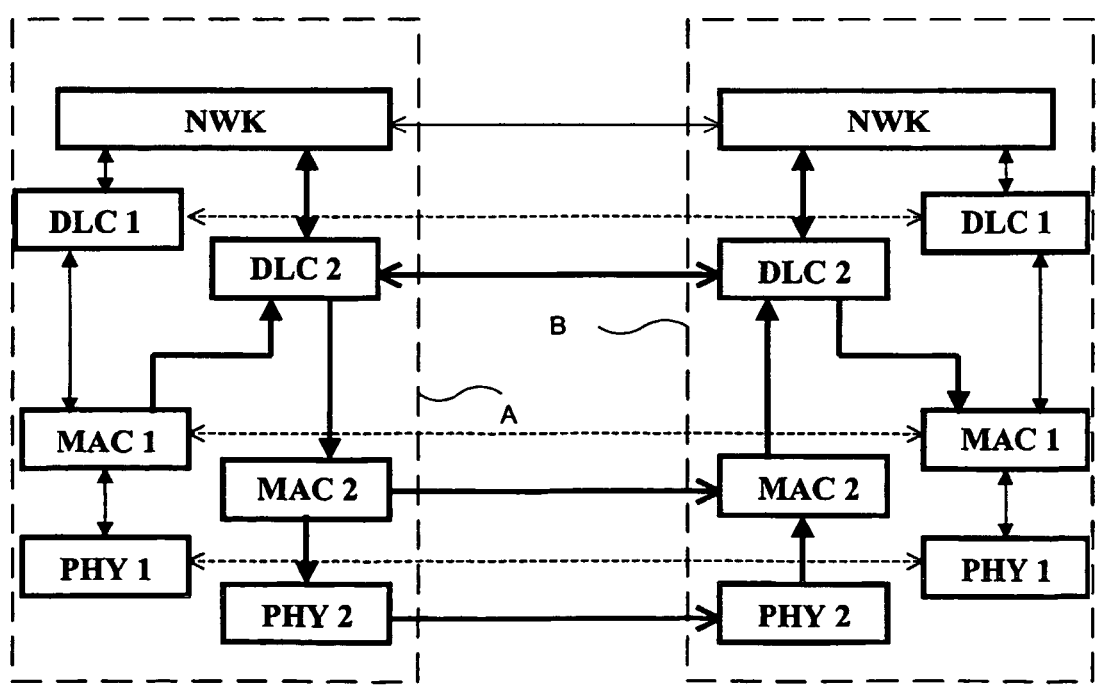
FIG. 7 illustrates an OSI model to support low-rate and high-rate modes with a dual-mode transceiver with advanced transmitter for asymmetric usage according to an advantageous embodiment of the present invention.

FIG. 7 shows the protocol stacks in units A and B with a high-rate link only from A to B according to an embodiment of the present invention. In this particular example, the return link for link 2 applies both the PHY_1 and MAC_1 layers of link 1. This means that any control information (e.g. acknowledgements of packets) referring to the traffic on link 2 is carried by link 1. This means that the return link is not visible at all on the medium where link 2 is mapped. As an example, classic Bluetooth in its high-rate mode uses a frequency-hopping scheme with a channel bandwidth of 1 MHz. The channel hops over a range of about 80 MHz in the 2.4 GHz ISM band. The proposed high-rate mode (see U.S. Pat. No. 6,519,460 filed Aug. 30, 1999, entitled "Resource Management in Uncoordinated Frequency Hopping System" by J. C. Haartsen which is incorporated into the present application by reference) uses a static channel of 4 MHz which is positioned somewhere in the 80 MHz band in the 2.4 GHz ISM band using a Dynamic Channel Selection algorithm. In the embodiment according to FIG. 7, the traffic from unit A to unit B is transported over the 4 MHz, wideband channel. However, the corresponding acknowledgement of the retransmission scheme, and the flow control information is carried over the frequency-hopping channel.

The access to the 4 MHz channel and the access to the FH channel is completely separated. Therefore, in unit B the MAC_2 mechanism for the wideband reception and the MAC_1 mechanism for the return, narrowband transmission are completely separated. That is, the forward and return streams are split at the DLC level. Likewise, the MAC_2 mechanism for the wideband transmission and the MAC_1 mechanism for the return, narrowband reception in unit A are completely separated.

Figure 8:
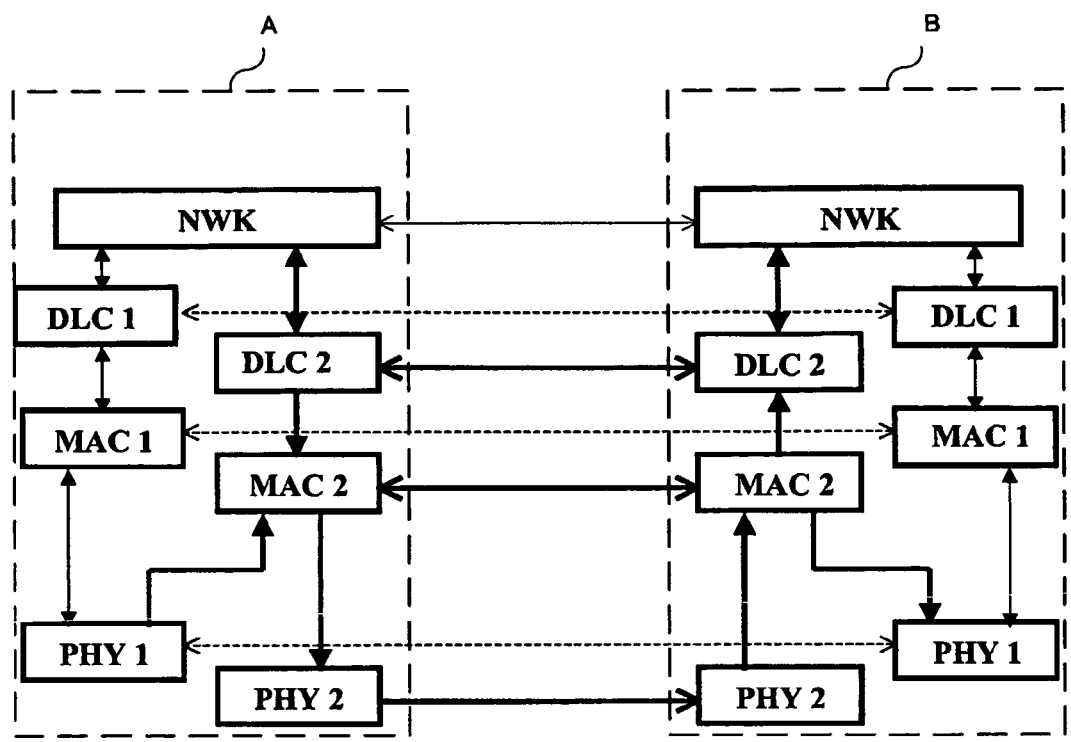
FIG. 8 illustrates an OSI model to support low-rate and high-rate modes with a dual-mode transceiver with advanced receiver for asymmetric usage according to an advantageous embodiment in the current invention.

FIG. 8 illustrates an OSI model to support low-rate and high-rate modes with a dual-mode transceiver with advanced receiver for asymmetric usage according to an alternative embodiment in the current invention. This embodiment uses the MAC protocol for both the high-rate forward transmission and basic rate return transmission. However, the PHY layers are different for the forward and return link. This would mean that the return link applies the same medium and access technique as the forward link, but the packetizing and RF modulation schemes correspond to the PHY layers for the high-rate and basic rate, respectively. For the Bluetooth and its high-rate mode, this means that the return link uses the same static RF frequency as the forward link, but it uses the conventional narrowband modulation and packets. In this embodiment, the forward and return streams split at the MAC layer.

If a distributed MAC protocol is used, both transmitter and receiver embodiments pose an extra complication as the high-rate receivers of other units participating on the high-rate channel cannot decode the narrowband transmission in the return link. This is overcome by informing other users on the high-rate channel of the fact that unit B will respond on the low-rate channel to high-rate transmission. Either the units can switch to this basic mode to listen to the return channel, or they take into account the time duration the return message occupies the medium.

Summarizing, this invention has described asymmetric dual-mode transceivers that can transmit and receive in a basic or low-rate, but can only receive or only transmit in the high-rate. Feed back/control information associated with information sent on the high-rate channel is transported by the low-rate channel. The invention allows solutions with reduced cost as complicated transmitters can be omitted in receive-only applications, while complicated receivers can omitted in transmit-only applications.

With the invention as described, wireless devices will obtain the possibility to send information at high rate with little additional implementation cost while return information is received with the conventional receiver.

What is claimed is:

1. A transceiver for dual-mode radio communications, comprising:
   means for establishing a bi-directional link for exchanging control information;
   a high data rate (high-rate) transmitter coupled with a uni-directional link for transmitting user information if the transceiver is primarily a transmitter of user information; or
   a high data rate receiver coupled with the uni-directional link for receiving user information if the transceiver is primarily a receiver of user information;
   a return channel utilizing a low-data rate (low-rate) interface for supporting the user information transmissions over the high-rate link; and
   means for splitting forward and return transmissions at a Data Link Control (DLC) layer wherein a high-rate section of the transceiver is operable on one Media Access Control (MAC) layer and a low-rate section is operable on a second MAC layer.

2. The transceiver of claim 1, further comprising:
means for carrying data link control and media access layer on a high-rate physical channel in one direction; and,
means for carrying the data link control and media access layer in the reverse direction on a conventional physical channel.

3. The transceiver of claim 1, wherein the dual mode transceiver comprising a high-rate transmitter further comprises:
a basic receiver section;
a basic transmitter section; and,
a high-rate transmitter section.

4. The transceiver of claim 1, wherein the dual mode transceiver comprising a high-rate receiver further comprises:
a basic receiver section;
a basic transmitter section; and,
a high-rate receiver section.

5. A transceiver for dual-mode radio communications, comprising:
means for establishing a bi-directional link for exchanging control information;
a high data rate (high-rate) transmitter coupled with a uni-directional link for transmitting user information if the transceiver is primarily a transmitter of user information; or
a high data rate receiver coupled with the uni-directional link for receiving user information if the transceiver is primarily a receiver of user information;
a return channel utilizing a low-data rate (low-rate) interface for supporting the user information transmissions over the high-rate link; and
means for splitting forward and return transmissions at a Media Access Control (MAC) layer, wherein a high-rate section of the transceiver is operable on one physical layer and a low-rate section is operable on a second physical layer;
wherein the transceiver informs other user devices on the high-rate channel that the transceiver will respond on the low-rate channel to high-rate transmission.

6. A method of asymmetric communications via a transceiver, comprising the steps of:
exchanging control information over a bi-directional link;
transmitting user information utilizing a high-rate transmitter via a uni-directional link if the transceiver is primarily a transmitter of user information;
receiving the user information utilizing a high-rate receiver via the uni-directional link if the transceiver is primarily a receiver of the user information;
supporting the user information transmissions over the high-rate link with a return channel utilizing a low-data rate (low-rate) interface; and
splitting forward and return transmissions at a Data Link Control (DLC) layer wherein a high-rate section of the transceiver is operable on one Media Access Control (MAC) layer and a low-rate section is operable on a second MAC layer.

7. The method of claim 6, further comprising the step of carrying data link control and media access layer on the high-rate physical channel in one direction, wherein the conventional physical channel carries the data link control and media access layer in the reverse direction.

8. The method of claim 6, wherein, for a dual mode transceiver comprising a high-rate transmitter, further comprises the steps of:
receiving narrowband transmissions in a basic receiver section;
transmitting narrowband transmissions in a basic transmitter section; and,
transmitting wideband transmissions in a high-rate transmitter section.

9. The method of claim 6, wherein, for a dual mode transceiver comprising a high-rate receiver, further comprises the steps of:
receiving narrowband transmissions in a basic receiver section;
transmitting narrowband transmissions in a basic transmitter section; and,
receiving wideband transmissions in a high-rate receiver section.

10. A method of asymmetric communications via a transceiver, comprising the steps of:
exchanging control information over a bi-directional link;
transmitting user information utilizing a high-rate transmitter via a uni-directional link if the transceiver is primarily a transmitter of user information;
receiving the user information utilizing a high-rate receiver via the uni-directional link if the transceiver is primarily a receiver of the user information;
supporting the user information transmissions over the high-rate link with a return channel utilizing a low-data rate (low-rate) interface;
splitting forward and return transmissions at a Media Access Control (MAC) layer wherein a high-rate section of the transceiver is operable on one physical layer and a low-rate section is operable on a second physical layer; and
informing other users on the high-rate channel that the transceiver will respond on the low-rate channel to high-rate transmission.

* * * * *